J. I. ARBOGAST.
INDIVIDUAL GLASS POT OR TANK.
APPLICATION FILED NOV. 16, 1907.
905,489.
Patented Dec. 1, 1908.
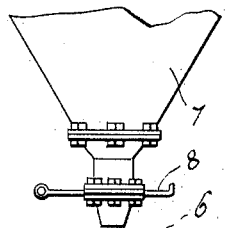
Fig. 1.
Fig. 2.
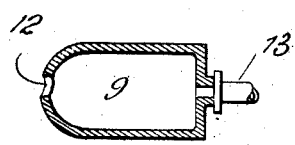
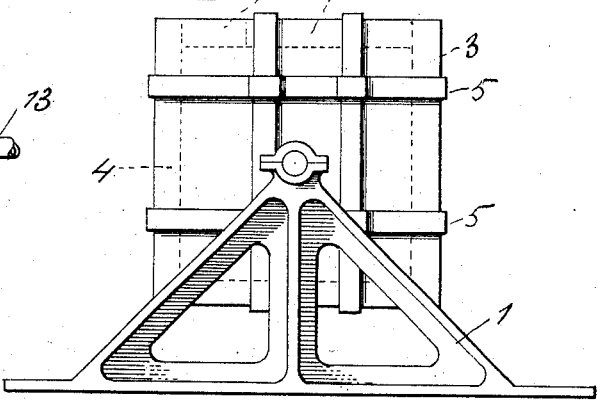
Fig. 5.
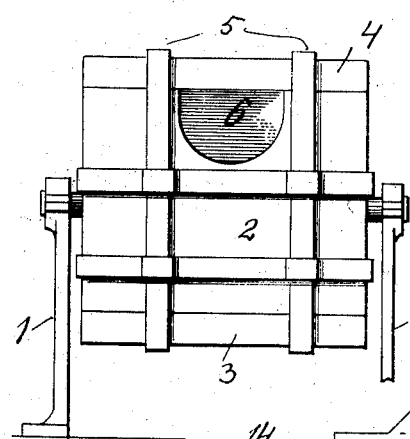
Fig. 3.
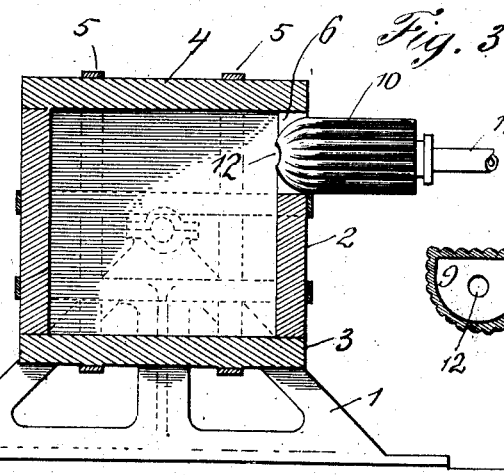
Fig. 4.
Fig. 6.
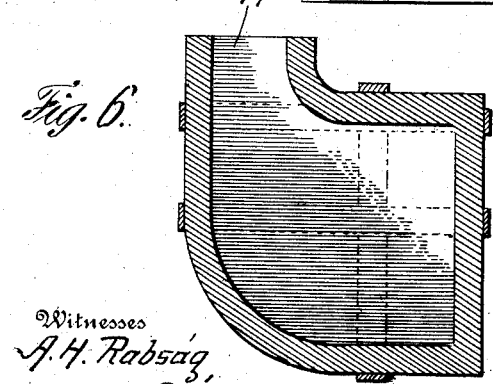
Fig. 7.
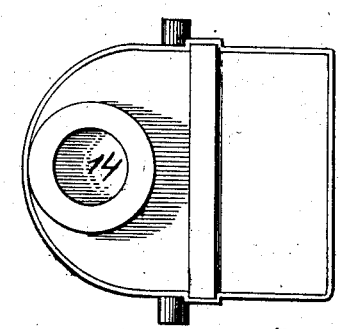
Witnesses
A. H. Rabsag,
A. H. Butler.
Inventor
John I. Arbogast,
By H. C. Everett
Attorneys

UNITED STATES PATENT OFFICE.

JOHN F. ARBOGAST, OF PITTSBURG, PENNSYLVANIA, ASSIGNOR OF ONE-HALF TO HENRY L. COLLINS, OF PITTSBURG, PENNSYLVANIA.

INDIVIDUAL GLASS POT OR TANK.

No. 905,489.     Specification of Letters Patent.     Patented Dec. 1, 1908.

Application filed November 16, 1907. Serial No. 402,394.

*To all whom it may concern:*

Be it known that I, JOHN I. ARBOGAST, a citizen of the United States of America, residing at Pittsburg, in the county of Allegheny and State of Pennsylvania, have invented certain new and useful Improvements in Individual Glass Pots or Tanks, of which the following is a specification, reference being had therein to the accompanying drawing.

This invention relates to an individual glass pot or tank, and the objects of the invention are, first, to provide a pot or tank wherein a combined stopper and burner are employed for melting the contents of the pot or tank, second, to dispense with the use of large tanks and furnaces in factories, thereby reducing the cost of fuel and time heretofore incurred by negligence on the part of workmen, strikes, and other occurrences detrimental to the production of glass ware; third, to provide a pot or tank for melting the material from which glass is made which will be simple in construction, durable, and of such construction that it can be easily filled and the material melted. I attain these objects by a pot designed for small batches of material, although the pots can be constructed of an excedingly large size.

In providing an individual pot, I not only attain the objects above specified, but increase the output of a glass factory, insure a higher grade of production and facilitate the work in general in the production of all kinds of glass ware.

The invention will be described in detail and then specifically pointed out in the appended claims.

In the drawing: Figure 1 is a side elevation of a pot constructed in accordance with my invention, illustrating the pot in a tilted position for receiving material automatically from a hopper located above said pot or tank. Fig. 2 is a longitudinal sectional view of the combined stopper and burner used in connection with the pot, Fig. 3 is a vertical sectional view of the pot, illustrating the burner in elevation, Fig. 4 is a cross sectional view of the burner, Fig. 5 is a front elevation of the pot, Fig. 6 is a vertical sectional view of a modified form of pot, and Fig. 7 is a plan of the same.

To put my invention into practice, I provide bearings 1, between which is trunnioned the pot proper, consisting of walls 2, a bottom 3 and a top 4. The bottom 3, top 4 and the walls 2 are made of a non-fusible material and are connected together by metallic straps 5 or similar fastening means.

One of the side walls 2 at its upper edge is provided with an opening 6 through which material is placed into the pot, the pot being tilted to allow material to pass from the hopper 7 suitably supported above the pot. This hopper is provided with a gate 8 for automatically controlling the discharge of material from said hopper into the pot or tank.

In connection with the pot I use a combined stopper and burner of a novel construction. The combined stopper and burner are approximately the same size as the opening 6 and are adapted to protrude therein. The structural features of the stopper and burner are a mushroom head 9 having exterior corrugations 10, these corrugations allowing gas and fumes to escape from the pot, while the contents thereof are being melted, also allowing a sufficient quantity of air to enter the pot, to assist in the combustion within said pot, and insure proper consistency of the glass being melted.

The mushroom head 9 has a central opening 12 and is connected to a suitable gas supply pipe 13, preferably of a flexible nature, whereby the stopper and burner can be removed when it is desired to tilt the melting pot. The gas supply is under pressure and the intensity of the flame is adapted to melt the material contained within the pot.

In Figs. 6 and 7 of the drawings I have illustrated a modified form of pot having a neck or spout 14, this neck or spout accommodating a stopper and burner, besides being used as an opening for placing material in the pot and removing the same after it has been melted.

With an individual pot such as above described, it will be evident that should any one of a series of pots be damaged, it will not place any other of the series out of commission, and the damaged pot may be repaired without interfering with any of the other pots.

In arranging the pot beneath a suitable hopper containing material from which glass is made, I avoid the necessity of rehandling material and employing labor to do so, consequently expediting the operation of melting glass by filling the pot or tank automatically.

For plate house and casting work this glass pot or tank is exceedingly rapid and economical.

Having now described my invention what I claim as new, is:—

1. A glass pot comprising a tiltable hollow body provided in one of the sides thereof with a combined filling and burner opening, and a combined stopper and burner for said opening, comprising a hollow head provided with an opening in each end and having a flat upper face and curved side walls and bottom wall and provided with longitudinally extending corrugations, substantially as described.

2. The combination with a glass pot having a combined filling and burner opening, of a combined stopper and burner for said opening comprising a hollow head provided with longitudinally extending exterior corrugations, said head provided at each end with an opening.

3. A combined stopper and burner for the opening of a glass pot, comprising a hollow head having a flat upper face and curved side walls and bottom wall, said head provided with an opening in each end, and having longitudinally extending exterior corrugations.

In testimony whereof I affix my signature in the presence of two witnesses.

JOHN I. ARBOGAST.

Witnesses:
F. C. ZERCHER,
R. A. BRANDON.